(12) United States Patent
Tanaka et al.

(10) Patent No.: US 8,416,653 B2
(45) Date of Patent: Apr. 9, 2013

(54) DISC ACCESS APPARATUS AND DISC ACCESS METHOD

(75) Inventors: Michinobu Tanaka, Kanagawa (JP);
Shinichi Tanaka, Kanagawa (JP);
Hideya Muraoka, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 12/745,089

(22) PCT Filed: Sep. 2, 2008

(86) PCT No.: PCT/JP2008/002402
§ 371 (c)(1),
(2), (4) Date: May 27, 2010

(87) PCT Pub. No.: WO2009/075046
PCT Pub. Date: Jun. 18, 2009

(65) Prior Publication Data
US 2010/0309757 A1   Dec. 9, 2010

(30) Foreign Application Priority Data

Dec. 11, 2007   (JP) ................................ 2007-319889

(51) Int. Cl.
*G11B 21/08*   (2006.01)
(52) U.S. Cl.
USPC ................. 369/30.23; 369/30.01; 369/30.03; 369/30.1; 369/47.31; 369/47.54; 360/78.01; 360/78.04

(58) Field of Classification Search ............... 369/30.01, 369/30.03, 30.1, 30.23, 47.31, 47.54; 360/78.01, 360/78.04
See application file for complete search history.

(56) References Cited

U.S. PATENT DOCUMENTS 6,563,999 B1   5/2003   Suzuoki
6,981,092 B2 *   12/2005   Piepho ......................... 711/111
(Continued)

FOREIGN PATENT DOCUMENTS

| JP | 2003280957 A | * | 10/2003 |
| JP | 200648816 A | | 2/2006 |
| JP | 2006190075 A | | 7/2006 |
| JP | 2006523882 A | | 10/2006 |

OTHER PUBLICATIONS

International Search Report for corresponding PCT application PCT/JP2008/002402, Oct. 7, 2008.
International Preliminary Report on Patenability for corresponding PCT application PCT/JP2008/002402, Jun. 15, 2010.

(Continued)

*Primary Examiner* — Daniell L Negron
*Assistant Examiner* — Brenda Bernardi
(74) *Attorney, Agent, or Firm* — Matthew B. Dernier, Esq.; Gibson & Dernier LLP

(57) ABSTRACT

The directory information on a file system recorded on an optical disc is cached onto a hard disk as a directory table. When accessing a file on the optical disc, a processor references the directory table so as to obtain information related to a position, on the disc medium, where the file to be accessed is located, without accessing the directory information on the optical disc. A disc I/O controller moves a pickup unit to the location indicated by the positional information on the file to be accessed and reads the data on the file. The pickup unit is used to detect signals from the optical disc.

8 Claims, 11 Drawing Sheets

U.S. PATENT DOCUMENTS

| | | | |
|---|---|---|---|
| 7,702,861 B2 | 4/2010 | Kelly et al. | |
| 2005/0002308 A1* | 1/2005 | Tanaka | 369/94 |
| 2006/0077770 A1* | 4/2006 | Abe | 369/30.01 |
| 2006/0087957 A1* | 4/2006 | Kelly et al. | 369/275.1 |
| 2006/0262671 A1* | 11/2006 | Morishita et al. | 369/30.03 |
| 2007/0014198 A1* | 1/2007 | Fukuda et al. | 369/30.2 |
| 2007/0086281 A1* | 4/2007 | Terada et al. | 369/30.07 |
| 2011/0199869 A1* | 8/2011 | Takazawa et al. | 369/30.03 |

OTHER PUBLICATIONS

Office Action for corresponding Japanese Patent Application No. 2007-319889, Dated Jan. 31, 2012.

* cited by examiner

DISC ACCESS APPARATUS AND DISC ACCESS METHOD

TECHNICAL FIELD

The present invention relates to a disc access apparatus and a disc access method for accessing a file on a disc medium.

BACKGROUND ART

Media players and personal computers that can play large-capacity optical disc media such as DVDs are now in wide use, and high-quality game contents and image contents, which are stored in DVDs and the like, are on offer. Also, using a DVD recording device incorporated in a DVD recorder or a personal computer, the user can readily record photos, videos, etc., on DVDs.

Also, Blu-ray Disc (BD: trademark or registered trademark) has been developed as an optical disc medium that can record hi-vision-class images and game contents, and it has begun offering fascinating contents of high image quality.

There are also game devices that have the function of reading out and playing image contents stored in an optical disc (See Patent Document 1, for instance).

[Patent Document 1] U.S. Pat. No. 6,563,999.

When an optical disc, such as a CD (Compact Disc) or a DVD, is to be accessed, the head including an optical pickup unit must be moved to the reading position, and this takes a seek time and a time for reading the file. A drawback in this is that the file system recorded on the optical disc takes a longer access time than the file system on a hard disk.

This problem of read rate with the optical disc is not so much felt when the disc with a music or video content is being played. This is because, with music or video, a single file of a large size is read out continuously, so that while the user may be conscious of the wait time before the start of playing, the latency for reading data will be covered up once the playing starts.

However, with an optical disc storing game content, various files are opened and read not only at the starting of a game application but also during the progress of the game. As a result, there are often waitings for access to the optical disc during the play of the game. Also, the individual files handled by the game application are small in size, and the files are accessed in a pattern similar to that of random access. This increases the seek time for the optical disc. Therefore, a problem with an optical disc having game contents recorded thereon is the access time to the optical disc that can sometimes have a negative effect on the real-timeliness of the game.

Also, BD employs a method of recording information in a plurality of layers in a similar manner to DVD. And with BD in particular, it is absolutely imperative that the depth of focus be finely adjusted using a servo motor while directing a laser beam to accurately adjust the depth of focus of the laser beam to a recording layer of high density. As a result, there is much load on a drive system in a pickup unit of the optical disc.

The present invention has been made in view of these problems and a purpose thereof is to provide a disc access technology for efficiently accessing a file system recorded on a disc medium.

SUMMARY OF THE INVENTION

In order to resolve the above problems, a disc access apparatus according to one embodiment of the present invention comprises: a cache configured to temporarily hold directory information on a file system recorded on a disc medium; a processor configured to reference the directory information held in the cache when a file on the disc medium is accessed, so as to obtain information related to a position, on the disc medium, where the file to be accessed is located; and a disc controller configured to read data on the file to be accessed, by moving a pickup unit to a location indicated by the positional information wherein the pickup unit is used to detect a signal from the disc medium.

The disc medium may be provided with at least two layers for recording information; the directory information may be recorded in a first layer of the disc medium and the file may be recorded in the first or second recording layer thereof.

Another embodiment of the present invention relates to a disc access method. This method comprises: reading directory information on a file system recorded on a disc medium; caching the directory information in a recording medium whose read rate is higher than the disc medium; referencing the cached directory information when a file of the file system is accessed, so as to obtain information related to a position, on the disc medium, where the file to be accessed is located, without accessing the directory information on the disc medium; and reading data on the file to be accessed, from a location indicated by the positional information on the disc medium.

Still another embodiment of the present invention relates to a computer program. The computer program, executed by a computer, comprises the functions of: caching directory information on a file system recorded in a first layer of a disc medium provided with a recording structure having at least two recording layers; referencing the cached directory information when a file recorded in a first or second layer on the disc medium is accessed, so as to obtain information related to a position, on the disc medium, where the file to be accessed is located, without accessing the directory information recorded in the first layer on the disc medium; and reading data on the file to be accessed, from a location indicated by the positional information on the disc medium.

This program may be provided as part of firmware, for performing a basic control of read/write of a disc medium, which is incorporated into equipment such as a disc controller. This firmware is stored, for example, in a semiconductor memory such as ROM or flash memory in the equipment. Also, this program may be provided as a basic software that is incorporated into an operating system or a part of library. A computer-readable medium encoded with said program executable by a computer may be provided in order to offer such a firmware, basic software or library or to update part of these. Also, the program may be transferred over a communication line.

Optional combinations of the aforementioned constituting elements, and implementations of the invention in the form of methods, apparatuses, systems, computer programs, data structure, recording media, and so forth may also be effective as additional modes of the present invention.

The present invention achieves an efficient access to a file system recorded on a disc medium.

EXPLANATION OF REFERENCE NUMERALS

Figure 1:
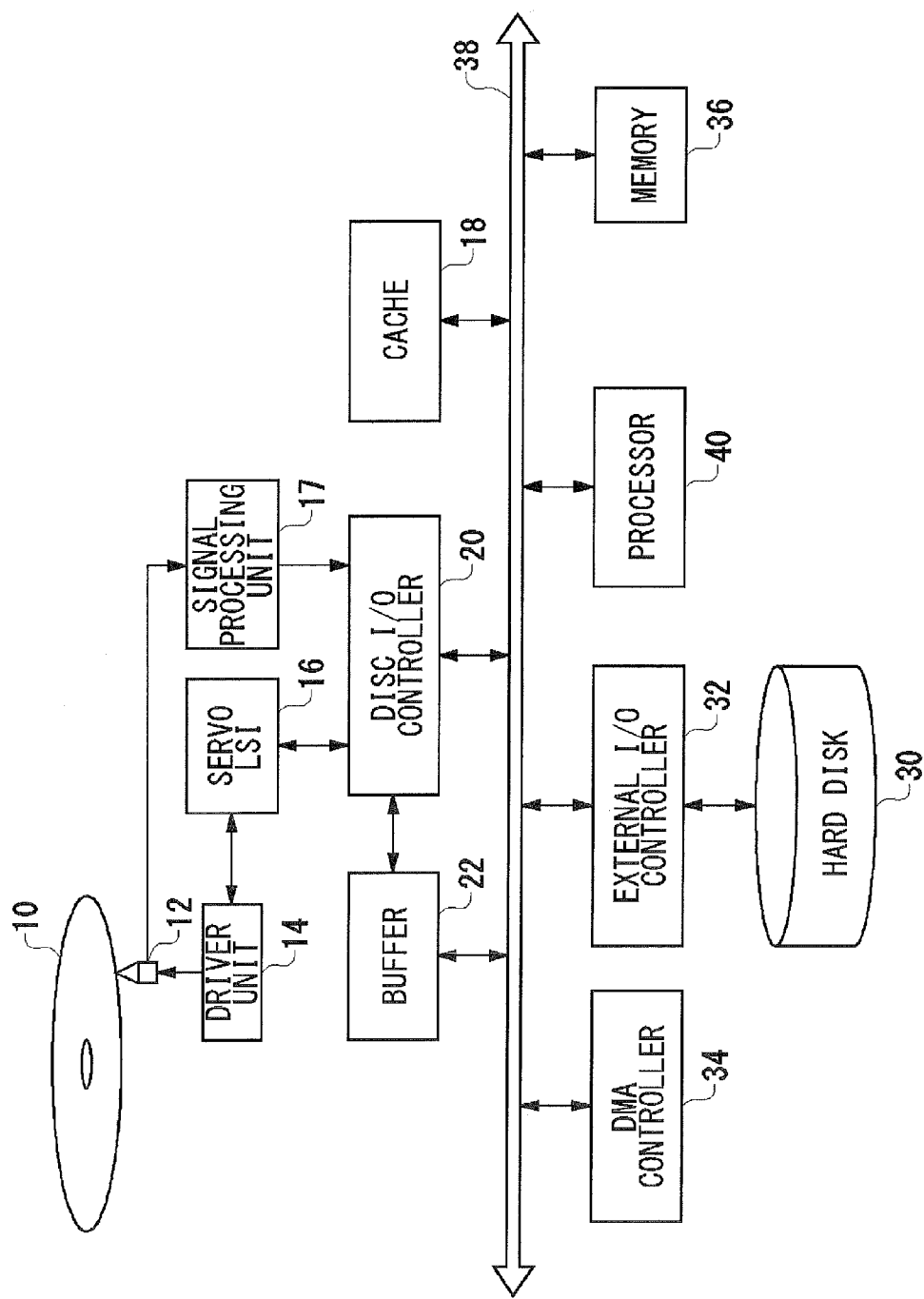
FIG. 1 illustrates a structure of a disc access apparatus according to an embodiment of the present invention.

10 Optical disc
12 Optical pickup unit
14 Driver unit
16 Servo LSI
17 Signal processing unit
18 Cache memory
20 Disc I/O controller
22 Buffer
30 Hard disk
32 External I/O controller
34 DMA controller
36 Main memory
38 Bus
40 Processor
100 File system
110 Path table
120 Directory record
170 Directory area
180 Directory table

DETAILED DESCRIPTION OF THE INVENTION

FIG. 1 illustrates a structure of a disc access apparatus according to an embodiment of the present invention. An optical disc 10 is inserted in a disc read unit of the disc access apparatus. The optical disc 10 is irradiated with a laser beam to read the information recorded on the optical disc 10. The laser beam is sent out with the focal length of a lens adjusted so that a layer of the optical disc 10 where information is recorded may come into focus. The reflected light from the optical disc 10 enters a light detector of an optical pickup unit 12.

The optical pickup unit 12 converts the captured reflected light into an electrical signal and delivers the electrical signal to a signal processing unit 17. The signal processing unit 17 demodulates the electrical signal, restores data recorded on the optical disc 10, and delivers the restored data to a disc I/O controller 20.

A driver unit 14 adjusts the depth of focus of an objective lens and moves the optical pickup unit 12 in a radial direction of the optical disc 10. A servo LSI 16 generates a control signal to control the focus of the objective lens in such a manner as to adjust the depth of focus of the laser beam to the recording layer of the optical disc 10 and gives the control signal to the driver unit 14. Also, the servo LSI 16 generates a control signal to fine-tune the optical axis by moving the optical pickup unit 12 in a radial direction of the optical disc 10 to have the laser beam converge on a desired track accurately and gives the control signal to the driver unit 14.

A disc I/O controller 20 receives information on the read position of the optical disc 10 from a processor 40 and reads specified data from the optical disc 10. The disc I/O controller 20 gives the servo LSI 16 a control signal for moving the optical pickup unit 12 to the read position. The disc I/O controller 20 receives data read from the optical disc 10 from the signal processing unit 17 and stores the data in a buffer 22.

The driver unit 14, the servo LSI 16, the signal processing unit 17, the disc I/O controller 20 and the buffer 22 constitute a disc access unit for reading the optical disc 10. The disc access unit is realized by a dedicated hardware or a combination of hardware and software. The disc access unit may be, for example, a general-purpose disc drive unit built in or external to a personal computer or a dedicated disc drive unit built in or external to a game device or other dedicated device.

The data read from the optical disc 10 by the disc I/O controller 20 and stored in the buffer 22 is DMA-transferred to main memory 36 by a DMA controller 34.

A processor 40 performs various processings using data transferred to the main memory 36. Also, the processor 40 may cache part of the data transferred to the main memory 36 in cache memory 18 or may store it in a hard disk 30. An external I/O controller 32 controls read and write of data to and from the hard disk 30 in response to commands from the processor 40. As will be discussed later, in order to realize more efficient accessing of the optical disc 10, the processor 40 caches the directory structure of the file system of the optical disc 10 in the cache memory 18 and caches the records of all directories in the hard disk 30.

Figure 2A:
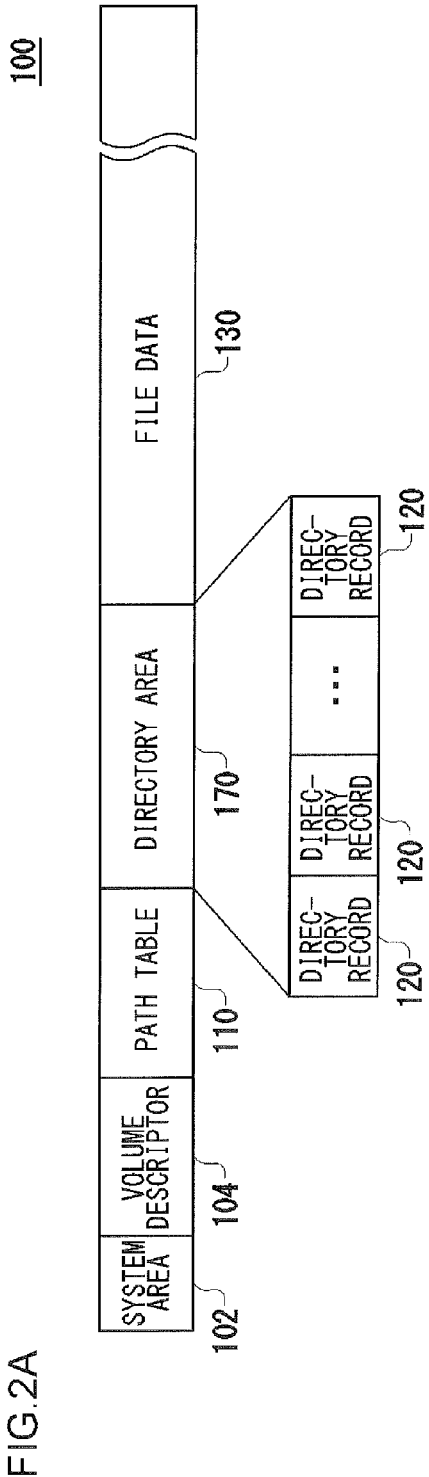
FIGS. 2A to 2C are diagrams for explaining a data structure of a file system recorded in an optical disc.
Figure 2C:
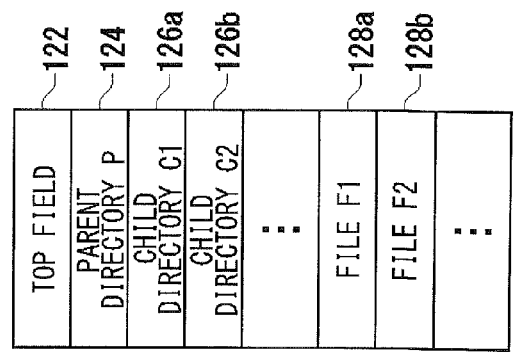
Figure 2B:
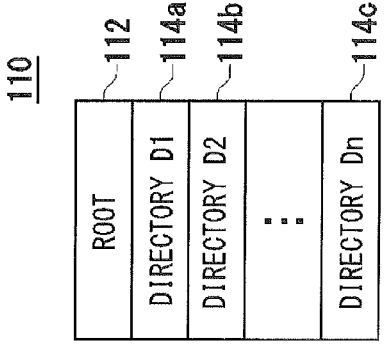

FIGS. 2A to 2C are diagrams for explaining the data structure of the file system recorded in the optical disc 10. Here, a description will be given of the ISO 9660 format as an example of the file system of the optical disc 10. However, it should be noted that the embodiments of the present invention are not limited to any specific format. The ISO 9660 is a standard for CD-ROM file system stipulated by the International Organization of Standardization (ISO). The CD-ROM file system can be read by a variety of operating systems and is in wide use because of its high reading compatibility. The ISO 9660 can be used as the file system for DVD or Blu-ray Disc. It is also possible to use UDF (Universal Disk Format), which is capable of both recording and reproducing, as the file system to replace the ISO 9660. Also, even when the operating system is incompatible with UDF, a UDF bridge format may be used which has gained compatibility by enabling reproduction by the ISO 9660.

FIG. 2A shows a format of a file system 100 stored on the optical disc 10. At the head of the optical disc 10, a system area 102 is provided, and following this system area 102 a volume descriptor 104, a path table 110, a directory area 170 and file data 130 are stored. The volume descriptor 104 contains information on the volume of the optical disc 10, that is, the names of the volume and creator, the positions of the path table and root directory, and so forth.

The path table 110 is a table of path information on all the directories in a volume arranged in a breadth-first search order, and the table thereof is referenced in order to realize a high-speed search of directories. Since the seek time for an optical disc is longer than the seek time for a hard disk, it will be extremely inefficient to search for a subdirectory through directories one by one from the root as with the file system of the hard disk. Therefore, if the path table 110 storing a directory structure is cached in the cache memory 18 when the optical disc 10 is loaded, then even a subdirectory in a deep position will be accessed in a short time.

As shown in FIG. 2B, the path table 110 stores path information on directories D1, D2, . . . , Dn (reference numerals: 114a, 114b, . . . , 114c) in a breadth-first search order starting from a root 112. Recorded in the path information on each directory are a directory identifier, which is equivalent to a directory name, the length of the directory identifier, the position of the directory, the number of the parent directory, and the like.

The directory area 170 is an array of directory records 120 of all the directories in the volume. Each directory record 120 is a structure having recorded information on files and subdirectories contained in the directory. Note that the aggregate of the directory records 120 of all or part of the directories stored in the directory area 170 is called a directory table 180, and the directory table 180 is cached in the hard disk 30 as will be described later.

FIG. 2C shows a directory record 120 of directory Di. The directory record 120 contains the respective records of a parent directory P (reference numeral: 124) of the directory Di, child directories C1, C2 (reference numerals: 126a and 126b) immediately below the directory Di, and files F1, F2 (reference numerals: 128a and 128b) contained in the directory Di. The top field 122 is simply a target of the pointer pointing at the directory record 120, and, in implementation, it is the initial address of the area where the directory record 120 is stored. Each record of a directory or a file contains the record length and other information such as the leading position, size and identifier of the directory or file.

Figure 3:
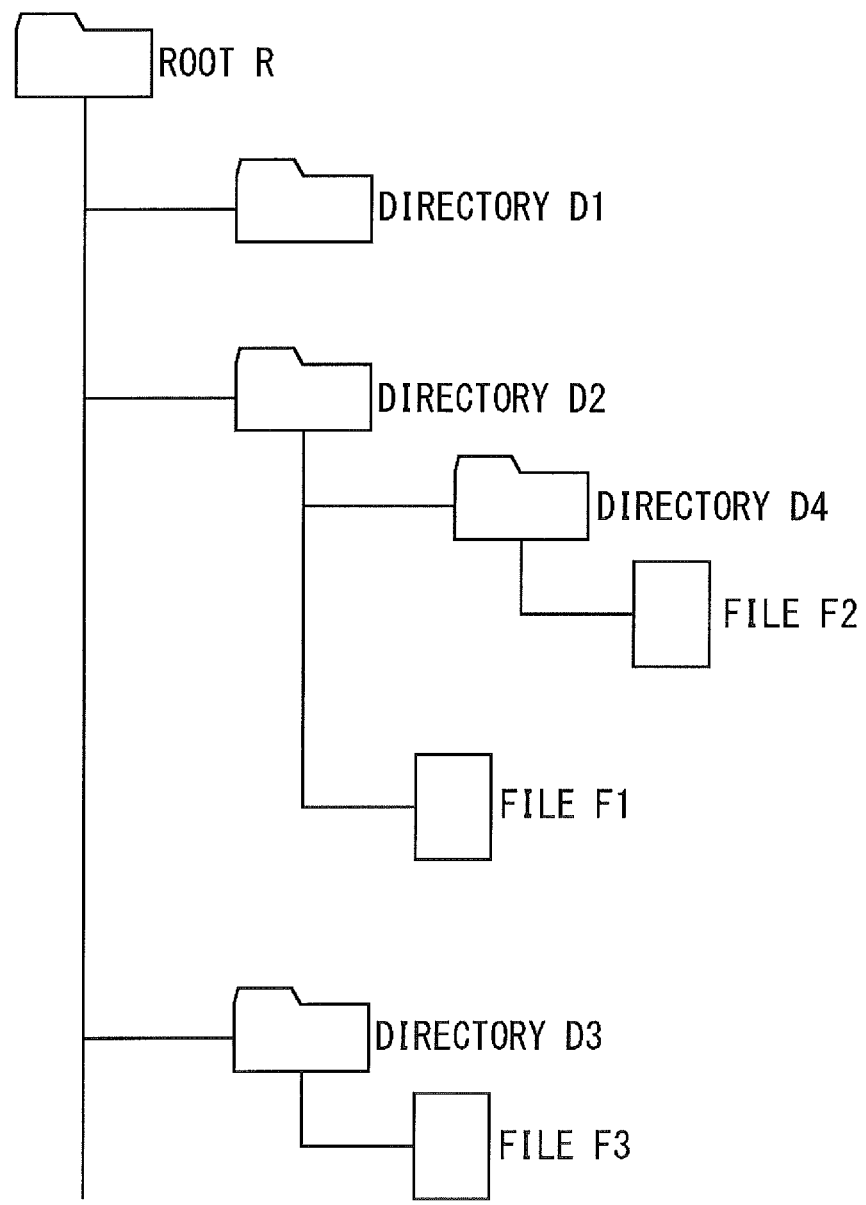
FIG. 3 is a diagram showing an example of a directory structure of a file system.

FIG. 3 is a diagram showing an example of the directory structure of the file system 100. There are the first directory D1, the second directory D2 and the third directory D3 directly below the root R, and there is the fourth directory D4 as a subdirectory directly below the second directory D2. The second directory D2 contains a file F1, the third directory D3 contains a file F3, and the subdirectory D4 of the second directory contains a file F2.

Figure 4:
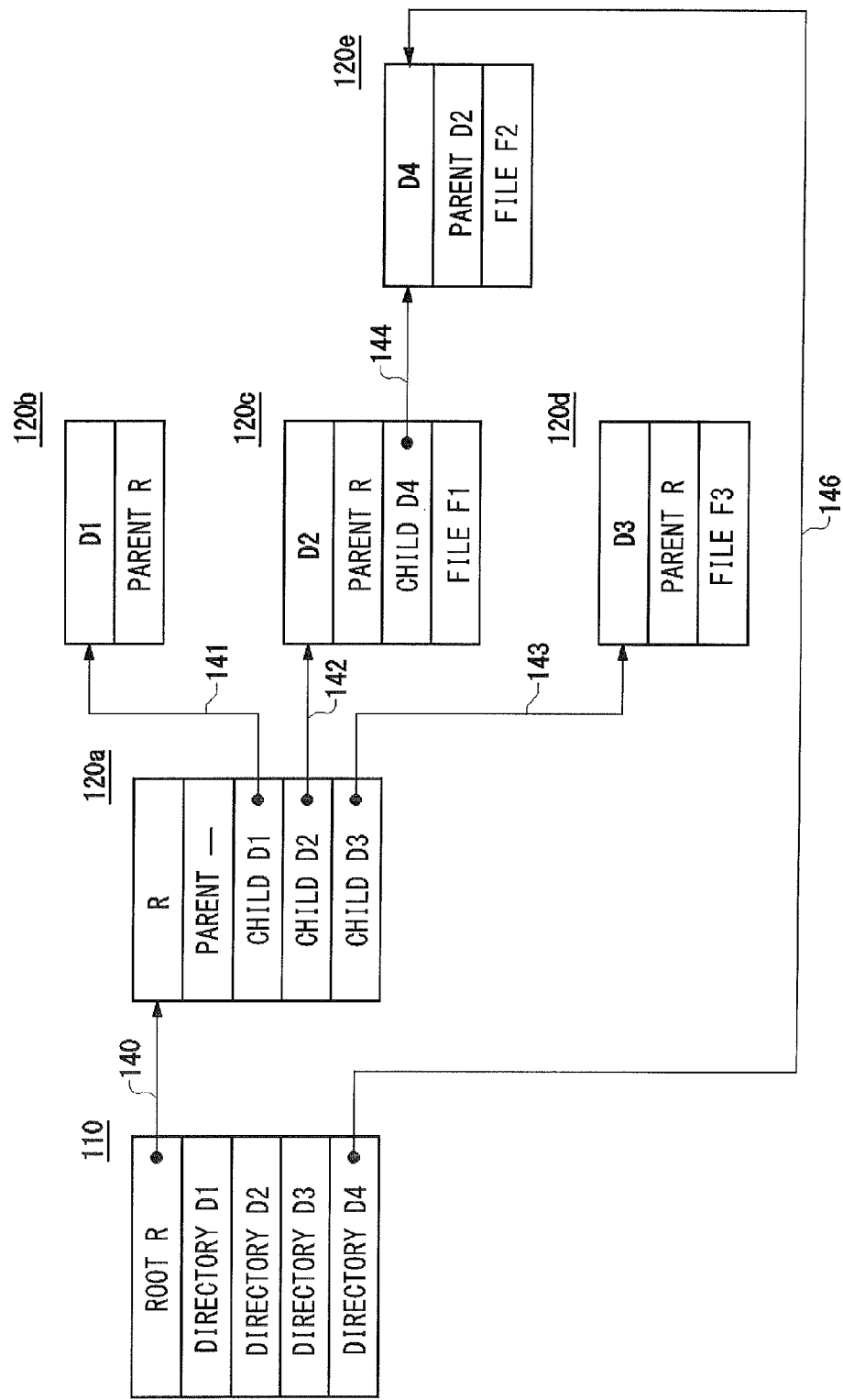
FIG. 4 is a diagram for explaining a data structure of a path table and directory record prepared in correspondence to the directory structure of FIG. 3.

FIG. 4 is a diagram for explaining a data structure of the path table 110 and directory record 120 prepared in correspondence to the directory structure of FIG. 3. The path table 110 stores the respective path information on directories D1, D2, D3 and D4 in a breadth-first search order starting from the root R. The processor 40 obtains a pointer to the directory record 120a of the root R from the path information on the root R stored in the path table 110 and references the directory record 120a of the root R (reference numeral 140).

Stored in the directory record 120a of the root R are the respective records of child directories D1, D2 and D3. The processor 40 obtains pointers to the directory records 120b, 120c and 120d (hereinafter referred to respectively as a "first directory record", a "second directory record" and a "third directory record") of the first, second and third directories D1, D2 and D3 from these records and references these directory records 120b, 120c and 120d (reference numerals: 141, 142 and 143).

The first directory D1 has neither a file nor a subdirectory, so that only the record of the root R, which is a parent directory, is stored in the first directory record 120b.

The second directory D2 contains the subdirectory D4 and the file F1, so that the record of the directory D4, which is a child directory, and the record of the file F1, in addition to the record of the root R, which is a parent directory, are stored in the second directory record 120c.

The third directory D3 does not have a subdirectory but contains the file F3, so that the record of the file F4, in addition to the record of the root R, which is a parent directory, is stored in the third directory record 120d.

The processor 40 obtains a pointer to the directory record 120e (hereinafter referred to as a "fourth directory record") of the fourth directory D4 from the record of the child directory D4 of the second directory record 120c and references the fourth directory record 120e (reference numeral: 144). The record of the file F2, in addition to the record of the parent directory D2, is stored in the fourth directory record 120e.

To access the file F2 stored in the subdirectory D4, the processor 40 can reach the record of the file F2 by following the directory records 120a, 120c and 120e in the order of the root R, the second directory D2 and the fourth directory D4 (that is, in the order of reference numerals 140, 142 and 144) by referencing the path table 110 and thus obtain the positional information on the file F2 from the record of the file F2.

Apart from the method of following the directories one by one from the root as described above, the processor 40 may also directly access the path information of the directory D4 stored in the file F2 by referencing the path table 110, obtain a pointer to the fourth directory record 120e, and directly reference the fourth directory record 120e (reference numeral: 146).

If the path table 110 storing the directory structure is cached in the cache memory 18, it is possible to directly access the directory record 120 of the subdirectory by referencing the path table 110 without following the tree structure of the directories one by one from the root. On the other hand, however, if there is a directory table 180 displaying directory records 120 of all the directories, it is possible to access any file in any subdirectory by following directories one by one from the root even when there is no path table 110. Hence, caching the path table 110 is optional.

Figure 5:
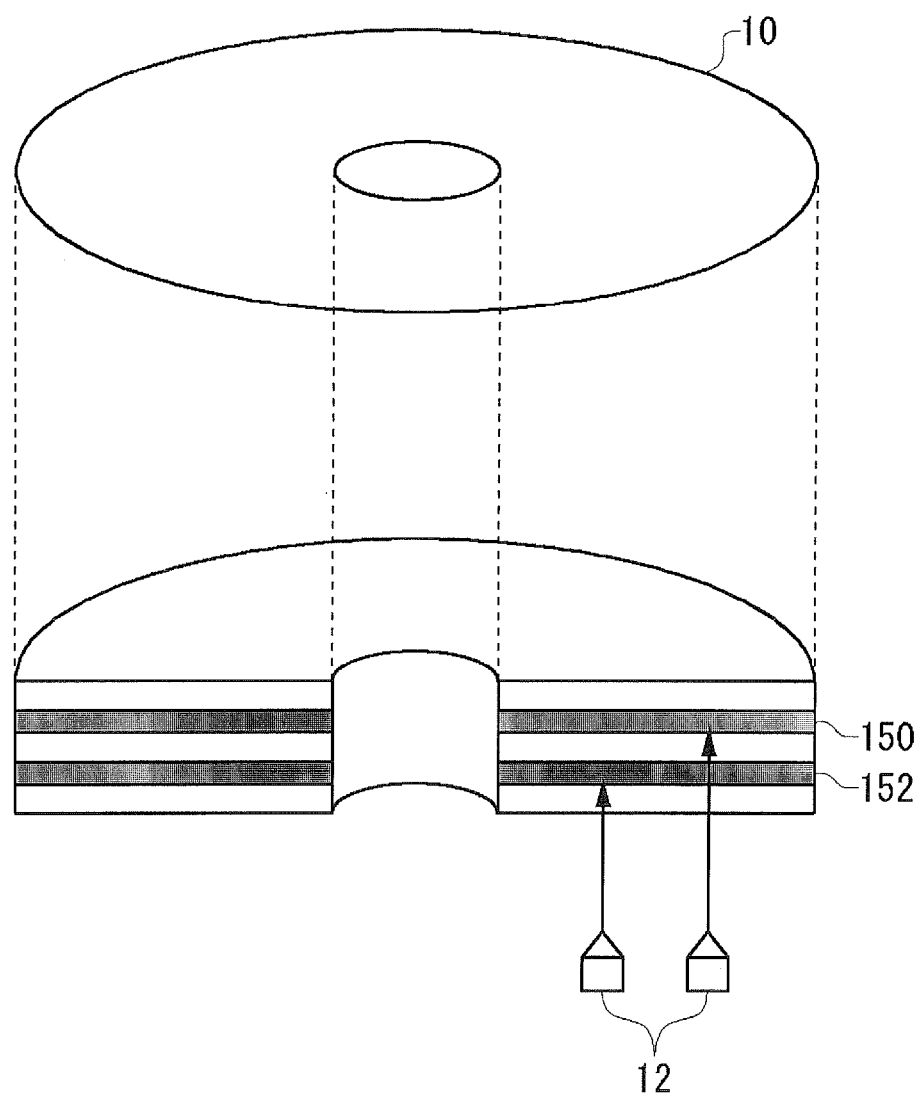
FIG. 5 is an illustration for explaining a physical layer structure of an optical disc.

FIG. 5 is an illustration for explaining a physical layer structure of the optical disc 10. DVD and BD employs a scheme of recording information in a plurality of layers in a disc. Here, a case where two layers are provided in the optical disc 10 is described. Since a first layer 150 and a second layer 152 have different depths of the recording layer, it is requisite that the depth of focus of the laser beam directed be precisely adjusted to each layer if the information recorded in each of the layers is to be read accurately. It is necessary to precisely adjust the focus of the laser beam from the optical pickup unit 12 to the depth of the first layer 150 to read the information recorded in the first layer 150. It is also necessary to precisely adjust the focus of the laser beam to the depth of the second layer 152 to read the information recorded in the second layer 152.

Particularly with BD, whose recording density is high, it is necessary to accurately adjust the depth of focus while directing the laser beam, and besides it is necessary to provide meticulous numerical control to the driver unit 14 of the optical pickup unit 12 using a servo motor. Thus, in a "layer jump", in which information is accessed across a different recording layer, the depth of focus must be adjusted for every jump over a recording layer. And this leads to a longer processing time and heating resulting from the consecutive driving of the motor.

Figure 6:
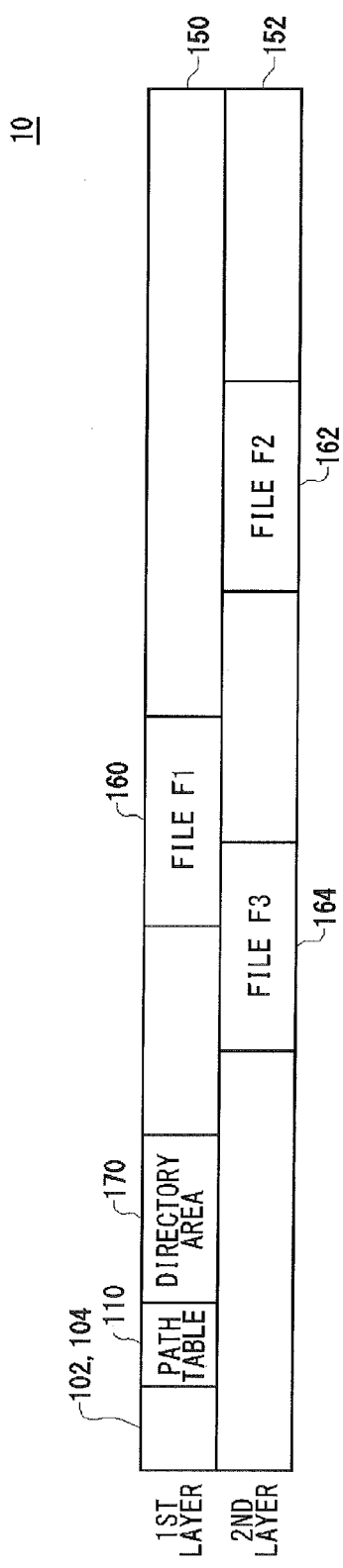
FIG. 6 is a diagram for explaining a logical layer structure of an optical disc shown in FIG. 1.

FIG. 6 is a diagram for explaining a logical layer structure of the optical disc 10. A description is given here of an example where the optical disc 10 has two layers which are commonly used. The structure thereof may be of three or more layers. In the optical disc 10, the file system 100 described in conjunction with FIG. 2A is recorded in the optical disc 10 in such a manner that the file system is divided into a component for a first layer 150 and that for a second layer 152 and then recorded therein. A system area 102, a volume descriptor 104, a path table 110 and a directory area 170 are recorded in the first layer 150 starting from the top. Each file is recorded in the first layer 150 or the second layer 152. Here, for the files F1, F2 and F3 stored in the directory structure described in conjunction with FIG. 3, the file F1 is recorded in the first layer 150 (reference numeral: 160), and the files F2 and F3 are recorded in the second layer 152 (reference numerals: 162 and 164, respectively).

In this manner, the directory area 170 in which a directory record 120 is recorded is placed in the first layer 150 of the optical disc 10. Thus, where a normal disc access method is used, the operating system first accesses the directory area 170 of the first layer 150 so as to read the directory record 120 and then an application accesses files placed in the second layer 152. Accessing a plurality of files in a shorter time results frequently in layer jumps (referred to as "layer changes" also), thus causing a motor driving system of the optical pickup unit 12 to be continuously in operation. Hence, accessing files takes longer and the response speed for the application deteriorates.

In the present embodiment, to reduce the cost required by the layer jumps, a method is employed where the directory records 120 in all of the directories in the optical disc 10 are cached in the hard disk 30 as the directory table 180 and referenced. For comparison, a description is first given of an operation of the optical pickup unit 12 in a case where the directory records 120 are not cached, with reference to FIG. 7, and then a method employed in the present embodiment with reference to FIG. 8 and FIG. 9.

FIGS. 7A to 7F are diagrams for explaining operations of the optical pickup unit 12 when the directory records 120 are not cached. In this case, according to the exemplary directory structure of FIG. 3, the directory records DR1 to DR4 of the first to fourth directories D1 to D4 (hereinafter, for simplicity, referred to as "first to fourth directory records") are recorded in the directory area 170 of the optical disc 10. Also, a file F1 belonging to the second directory D2 is recorded in the first layer 150, whereas a file F2 belonging to the fourth directory D4 and a file F3 belonging to the third directory D3 are recorded in the second layer 152. A description is now given of how the optical pickup unit 12 moves when the files F1, F2 and F3 are read in this order from the optical disc 10.

When the processor 40 executes a command to open the file F1, the processor 40 first gives the positional information on the second directory record DR2 to the disc I/O controller 20 in order to read the directory record DR2 of the directory D2, to which the file F1 belongs, from the optical disc 10.

At this time, the positional information on the second directory record DR2 can be directly obtained using path information on the second directory D2 stored in the path table 110 cached in the cache memory 18. If the path table 110 is not used, the following can be done as described in conjunction with FIG. 4. That is, the top position of the directory table 180 is given to the disc I/O controller 20 so as to read the directory table 180 from the root and search for the directory from the root, thereby reaching the second directory D2 and obtaining the positional information on the second directory record DR2.

Figure 7A:
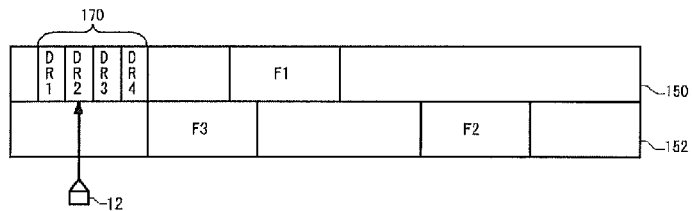
FIGS. 7A to 7F are diagrams for explaining operations of an optical pickup unit when a directory record is not cached.

After the disc I/O controller 20 has adjusted the lens focus of the optical pickup unit 12 to the first layer 150 where the directory area 170 is located, as shown in FIG. 7A, the disc I/O controller 20 moves the optical pickup unit 12 to the top position of the second directory record DR2 and then reads the directory record DR2. The processor 40 obtains the positional information on the file F1 from the second directory record DR2.

Figure 7B:
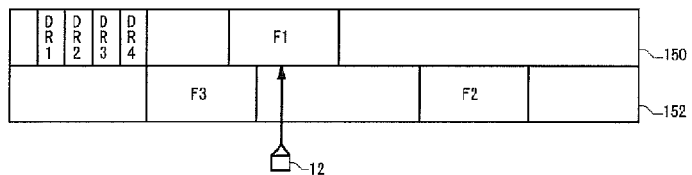

To read the file F1, the processor 40 gives the thus obtained positional information on the file F1 to the disc I/O controller 20. The disc I/O controller 20 determines, based on the positional information on the file F1, that the file F1 is in the first layer 150. As shown in FIG. 7B, while keeping the lens focus of the optical pickup unit 12 in the same position, the disc I/O controller 20 moves the optical pickup unit 12 to the top position of the file F1 and then reads the data on the file F1.

Then, when the processor 40 executes a command to open the file F2, the processor 40 first gives the positional information on the fourth directory record DR4 to the disc I/O controller 20 in order to read the directory record DR4 of the directory D4, to which the file F2 belongs, from the optical disc 10.

Figure 7C:
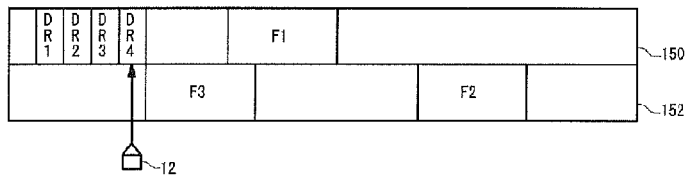

As shown in FIG. 7C, the disc I/O controller 20 moves the optical pickup unit 12 to the top position of the fourth directory record DR4 and then reads the fourth directory record DR4. The processor 40 obtains the positional information on the file F2 from the fourth directory record DR4.

Figure 7D:
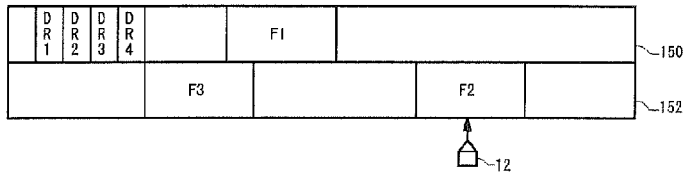

To read the file F2, the processor 40 gives the thus obtained positional information on file F2 to the disc I/O controller 20. The disc I/O controller 20 determines, based on the positional information on the file F2, that the file F2 is in the second layer 152. After the disc I/O controller 20 has adjusted the lens focus of the optical pickup unit 12 to the second layer 152, as shown in FIG. 7D, the disc I/O controller 20 moves the optical pickup unit 12 to the top position of the file F2 and then reads the directory record DR2.

Further, when the processor 40 executes a command to open the file F3, the processor 40 first gives the positional information on the third directory record DR3 to the disc I/O controller 20 in order to read the directory record DR3 of the directory D3, to which the file F3 belongs, from the optical disc 10.

Figure 7E:
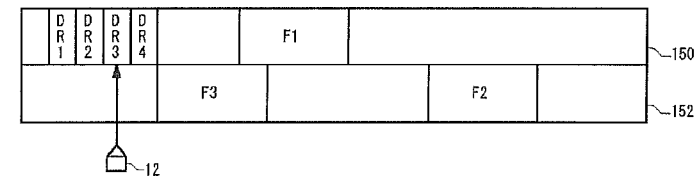

After the disc I/O controller 20 has adjusted the lens focus of the optical pickup unit 12 to the first layer 150 where the directory area 170 is located, as shown in FIG. 7E, the disc I/O controller 20 returns the optical pickup unit 12 to the top position of the third directory record DR3 and then reads the third directory record DR3. The processor 40 obtains the positional information on the file F3 from the third directory record DR3.

Figure 7F:
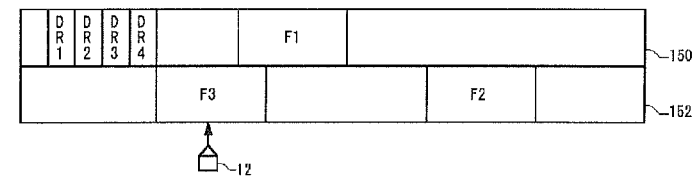

To read the file F3, the processor 40 gives the thus obtained positional information on file F3 to the disc I/O controller 20. The disc I/O controller 20 determines, based on the positional information on the file F3, that the file F3 is in the second layer 152. After the disc I/O controller 20 has adjusted the lens focus of the optical pickup unit 12 to the second layer 152, as shown in FIG. 7F, the disc I/O controller 20 moves the optical pickup unit 12 to the top position of the file F3 and then reads the data of file F3.

As described above, if the directory record 120 is not to be stored in the hard disk 30, it is required that the directory record of a directory to which the file belongs must be read by moving the optical pickup unit 12 to the first layer 150 where the directory area 170 is located, whenever a different file is opened. If the file to be opened is located in a layer (the second layer 152 in this case) different from the first layer 150 where the directory record is located, a layer jump will occur and the motor must be driven to adjust the lens focus. This takes time and heat is generated when the motor is consecutively driven.

Even if the file to be opened is in the same layer as the first layer 150 where the directory record is located, the optical pickup unit 12 must be returned once to a directory record near the top position of the first layer 150 even when a plurality of files contiguously positioned in the first layer 150 are read, every time the file is opened. This entails extra seek time for the head to move radially across the optical disc between the position of the directory record and the position of the file.

In the light of this, in the present embodiment the directory records 120 of all the directories in the directory area 170 of the optical disc 10 are read out at a time and in a lump, when the disc is loaded, and they are cached in the hard disk 30 as the directory table 180.

Figure 8:
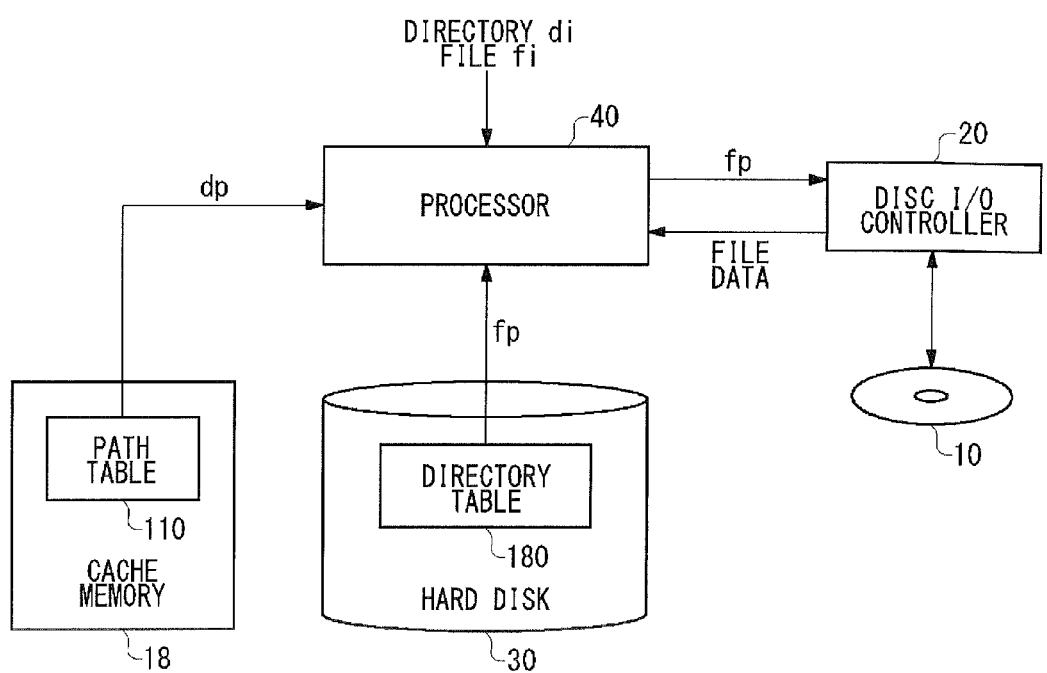
FIG. 8 is a diagram for explaining a structure by which a processor accesses a file system of an optical disc by referencing a directory table cached in a hard disk.

FIG. 8 is a diagram for explaining a structure by which the processor 40 accesses a file system of the optical disc 10 by referencing the directory table 180 cached in the hard disk 30. A path table 110 is cached in cache memory 18, and a directory table 180 is cached in a hard disk 30. The directory table 180 is written to a system reserved area that the operating system can reference as a cache.

As a command to open a file fi in a directory di is issued, the processor 40 references the path table 110 cached in the cache memory 18 and obtains positional information dp on the directory di where the file fi to be opened is stored. Then the processor 40 references the directory record 120 of said directory di from the directory table 180 cached in the hard disk 30, based on the positional information dp on the directory, and obtains positional information fp on the file fi stored in the directory di.

The processor 40 gives the positional information fp on the file fi to the disc I/O controller 20. Based on the positional information fp on the file fi, the disc I/O controller 20 determines in which layer of the optical disc 10 the file fi is recorded; after the disc I/O controller 20 has adjusted the lens focus of the optical pickup unit 12 to the layer where the file fi is recorded, the disc I/O controller 20 moves the optical pickup unit 12 to the top of recording position where the file fi is recorded. The disc I/O controller 20 reads the data on the file fi and gives it to the processor 40.

Figure 9A:
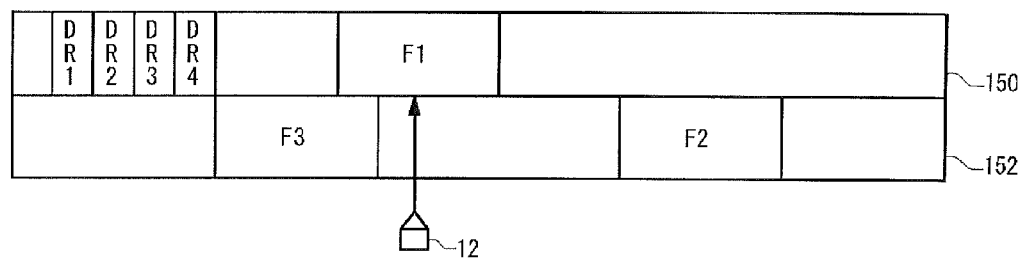
FIGS. 9A to 9C are diagrams for explaining operations of an optical pickup unit by referencing a directory table cached in a hard disk when a file of an optical disc is accessed.
Figure 9B:
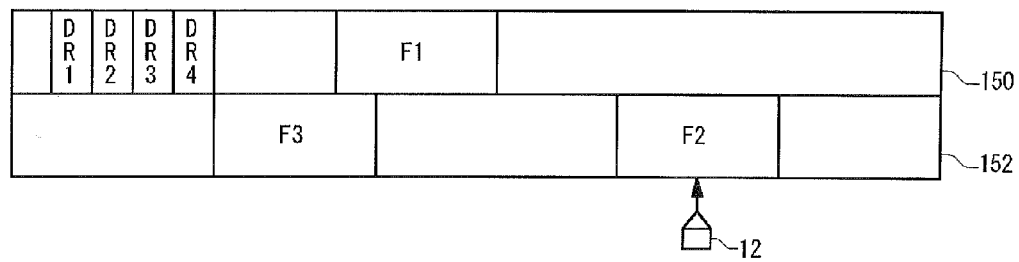
Figure 9C:
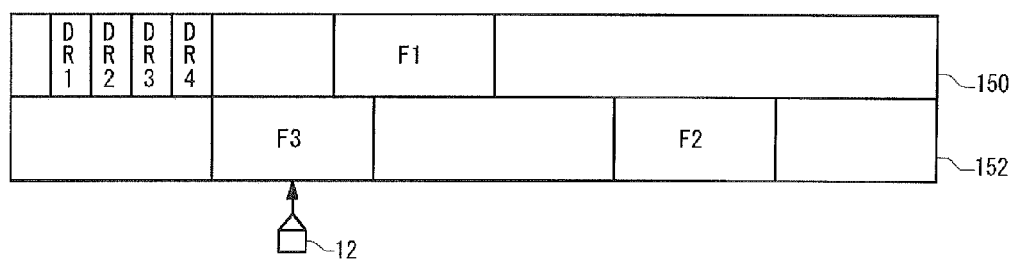

FIGS. 9A to 9C are diagrams for explaining operations of the optical pickup unit 12 by referencing the directory table 180 cached in the hard disk 30 when a file of the optical disc 10 is accessed. To compare with FIGS. 7A to 7F, a description is given of a case where the files F1, F2 and F3 stored in the directory structure shown in FIG. 3 are accessed in this order as well.

When the processor 40 executes a command to open the file F1 in the second directory D2, the processor 40 references the second directory record 120c in the directory table 180 stored in the hard disk 30, so that the positional information on the file F1 can be obtained without accessing the second directory record DR2 in the directory area 170 on the optical disc 10. After, based on the positional information given from the processor 40, the disc I/O controller 20 has adjusted the lens focus of the optical pickup unit 12 to the first layer 150 where the file F1 is stored, as shown in FIG. 9A, the disc I/O controller 20 moves the optical pickup unit 12 to the top position of the file F1 and then reads data on the file F1.

When the processor 40 executes a command to open the file F2 in the fourth directory D4, the processor 40 references the fourth directory record 120e in the directory table 180 stored in the hard disk 30, so that the positional information on the file F2 can be obtained. After the disc I/O controller 20 has received the positional information on the file F2 from the processor 40 and has adjusted the lens focus of the optical pickup unit 12 to the second layer 152 where the file F2 is stored, as shown in FIG. 9B, the disc I/O controller 20 moves the optical pickup unit 12 to the top position of the file F2 and then reads data on the file F2.

When the processor 40 executes a command to open the file F3 in the third directory D3, the processor 40 references the third directory record 120d in the directory table 180 stored in the hard disk 30, so that the positional information on the file F3 can be obtained. The disc I/O controller 20 receives the positional information on the file F3 from the processor 40. Since the file F3 is in the same second layer 152 where the file F2 had just recently been read, there is no need to change the lens focus of the optical pickup unit 12. The disc I/O controller 20 moves the optical pickup unit 12 to the top position of the file F3 and then reads data on the file F3.

As described above, so long as the directory table 180 is cached in the hard disk 30, there is no need to read each time an applicable directory record located in the directory area 170 of the first layer 150 of the optical disc 10. This requires no seek time for the optical pickup unit 12 to move to the directory area 170. Even when accessing a plurality of files in a layer different from the first layer 150 where the directory area 170 is located, there is no need to return to the first layer 150 where the directory area 170 is present. This means that there is no need to adjust the lens focus of the optical pickup unit 12 and therefore the driving of the motor can be reduced.

In particular when accessing a plurality of files in contiguous areas of the second layer 152 where the directory area 170 is not present, there is no need to access the first layer where the directory area 170 exists. As a result, the plurality of files can be accessed by continuously moving the optical pickup unit 12 in a radial direction without changing the lens focus of the optical pickup unit 12. Hence, caching the directory table 180 proves very effective.

It is believed that the use of two-layered BDs capable of recording a large volume of data will become mainstream in the next-generation game software in particular. If the directory table 180 is not cached at all, layer jumps will inevitably occur in accessing the files in the second layer. This will impose a constraint on the use of files located in the second layer especially in game software where the response speed is the vital factor. As the optical disc 10 becomes larger in capacity and as the number of files increases and thereby the file access patterns get ever complicated and the directory structure also gets more complicated, caching the directory table 180 proves very effective.

Figure 10:
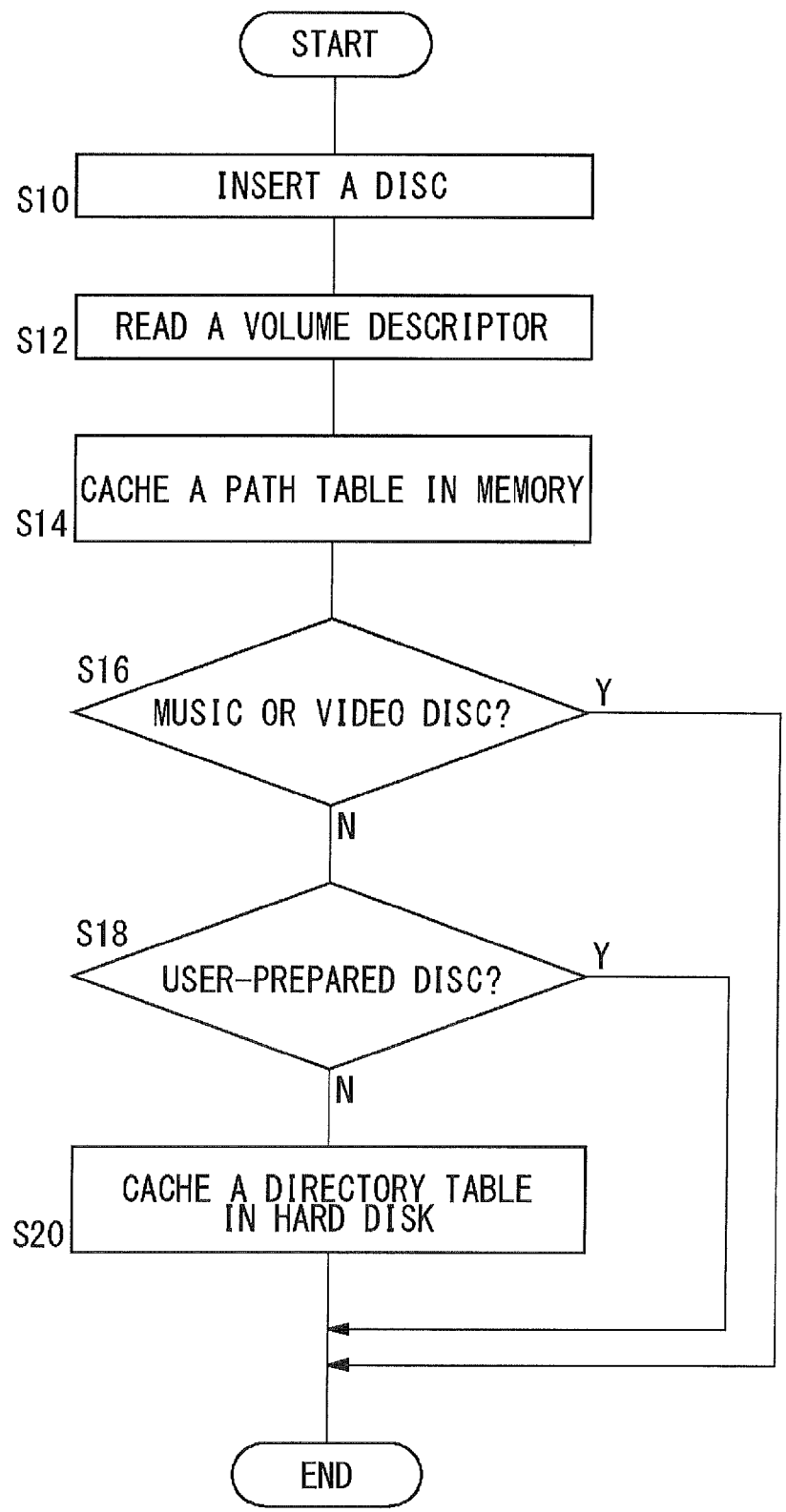
FIG. 10 is a flowchart for explaining a procedure for loading an optical disc by a disc access apparatus.

FIG. 10 is a flowchart for explaining a procedure for loading the optical disc 10 by the disc access apparatus of FIG. 1.

As the optical disc 10 is inserted (S10), the processor 40 reads a volume descriptor from the optical disc 10 (S12). The processor 40 obtains positional information on the path table 110 by referencing the volume descriptor, reads the path table 110 from the optical disc 10, and caches it in the cache memory 18 (S14).

The processor 40 determines whether the optical disc 10 is a music/video disc or else (S16). A system software, such as an operating system for the system's main unit, issues a command to inquire for the type of a disc in use to the disc I/O controller 20, and the system software obtains the response to the inquiry from the disc I/O controller 20. As a result, the system software can recognize the type of a disc in use. Generally, the disc drive unit is provided with a function of identifying the type of the optical disc inserted and providing the information indicating the type of the disc to a system such as a personal computer or game device on a main unit side to which the disc drive unit is connected. The operating system on the main unit side can receive the information indicating the type of the disc from the disc drive unit. As another method, the type of a disc in use can be determined by referencing the volume descriptor and acquiring the media type of the optical disc 10.

If the optical disc 10 is a music or video disc (Y of S16), the loading of the disc will be completed without caching the directory records 120. When it is a music or video disc, the directory structure thereof is simple, each file is large-sized and the number of files recorded therein is small. Hence, there are few advantages to achieving more efficient file accessing by caching the directory records 120. In the case of a video disc in particular, there is one or a few files, and accessing the files in random order is quite rare.

Next, the processor 40 determines whether the optical disc 10 is a disc prepared by a user for his/her personal purpose or not (S18). Whether it is a user-prepared disc or not can be determined by referencing the volume descriptor and checking the attribute of the volume.

If the optical disc 10 is a user-prepared disc (Y of S18), the loading of the disc will be completed without caching the directory records 120. When it is a user-prepared disc, the size of the directory table 180 may exceed the cache size defined beforehand in a system area of the operating system and consequently error may occur. This is because the number of directories and the number of files are arbitrary in this case. Particularly, in the case of a disc where the user has recorded the images taken by a digital camera, the number of directories or the number of files may be enormous and it is difficult to predict the size of the disc table 180 in advance.

If the optical disc 10 is neither the music/video disc (N of S16) nor the user-prepared disc (N of S18), the processor 40 will read the directory records 120 of all the directories from the directory area 170 of the optical disc 10 and cache them in the hard disk 30 as the directory table 180 (S20) so as to complete the loading of the optical disc 10. For example, if the optical disc 10 is a medium on which game software is recorded, the directory table 180 thereof will be cached in the hard disk 30.

If the total size of the directory records 120 of all the directories exceeds the cache size defined in the system area of the operating system when all the files of game software are to be recorded in the optical disc 10 using a software creation tool, alarm may be given out so as to thereby prohibit the recording of them on the optical disc 10. To cope with the alarm, game software developers change the directory structure and file structure so as to reduce the size of all the directories. This can guarantee that the optical disc 10 suffering from error resulting from the oversized directory table 180, whose size exceeds the defined size, when the disc is loaded will not be produced.

In the above-described procedure for loading the disc, whether the disc table 180 shall be cached or not may be determined based on whether the disc recognition has been done successively or not. A structure may be such that a driver in the optical disc 10 is provided with a function of checking if a particular authentication code is attached to the optical disc 10 or not and the authentication result is delivered to the system software on the main unit side. For example, where the disc access apparatus is mounted on a game device, the system software of the game device checks if the game software stored in the optical disc 10 has an appropriate authentication code associated with the model and version of the game device. And if the authentication passes, a control will be performed such that the directory table 180 is cached. If the authentication does not pass, a control will be performed such that the directory table 180 is not to be cached.

Also, in the above-described procedure for loading the disc, information on the version of game software stored in the optical disc 10 as well as information on the version of a game device associated therewith may be obtained. If the version information indicates that the version is the latest, the directory table 180 may be cached in the hard disk 30; if the version is old, the directory table 180 may not be cached in the hard disk 30. Or when the disc is loaded, the system software on the main unit side may reference the ID of game software stored in the optical disc 10 and whether or not said game software permits the caching of the directory table 180 may be determined. For that purpose, the system software may be configured such that a data base or a table storing the IDs of game software where the caching of the directory table 180 is permitted can be referenced.

Further, a disc driver may determine whether the optical disc 10 is of a single layer or two (or more) layers. If the optical disc 10 has a single layer, the directory table 180 may not be cached; if it has two (or more) layers, the directory table 180 may be cached. Also, combined with the pass/fail status of the authentication code, there are various combinations conceivable, depending on what is needed, in the criteria on whether the directory table 180 is to be cached or not. For example, if the optical disc 10 has two or more layers, the directory table 180 may be cached. If it has a single layer and has passed the authentication code, the directory table 180 may be cached. If it has a single layer but has failed to pass the authentication, the directory table 180 may not be cached.

In some of capable game softwares prepared for earlier-generation game devices, a wait time is set on the assumption that data is read from the optical disc 10 whose read rate is low, and a program is designed such that other processings are executed in parallel during data is read from the optical disc 10. In such cases, if the read rate of the optical disc 10 is improved by caching the directory table in the hard disk 30, the timing may get disrupted, thereby adversely affecting the execution of the program. Thus, if the version information reveals that game software for earlier-generation game devices is recorded in the optical disc 10, it may be necessary, in consideration of compatibility, that the directory table 180 be not cached in the disc table 180 on purpose.

In the above-described procedure for loading the disc, the option for not caching the directory table 180 according to the type or the like of the optical disc 100 is provided because of the following reasons. Since accessing the optical disc 10 takes time in the first place, it is required that reading and acquiring information, such as directory records, from the optical disc 10 when the disc is loaded be somehow advantageous even though it takes more than normally in the loading of the disc. If little or no merit is found in acquiring the disc records of a video disc or the like, inconvenience will actually occur unless the caching of the directory table 180 is avoided. In this case, therefore, the loading of the disc is preferably completed earlier by choosing not to cache it.

In the above-described procedure, the directory table 180 is read and cached when the optical disc 10 is loaded. Nevertheless, if the loading of the disc needs to be promptly completed, the directory table 180 may be read from the optical disc 10 and then cached with arbitrary timing other than the timing when the disc is loaded, e.g., in a period during which the system is in the idle state. Also, once the optical disc 10 is loaded, the cached directory table 180 is used before the optical disc 10 is removed. Thus, the operating system may perform a control such that no access is made to the directory area 170 of the optical disc 10. Also, when the optical disc 10 is removed and loaded again, the previously cached directory table 180 may be discarded and the directory table 180 may be reconstructed by reading again all the directory records 120 by accessing the directory area 170 of the optical disc 10.

Figure 11:
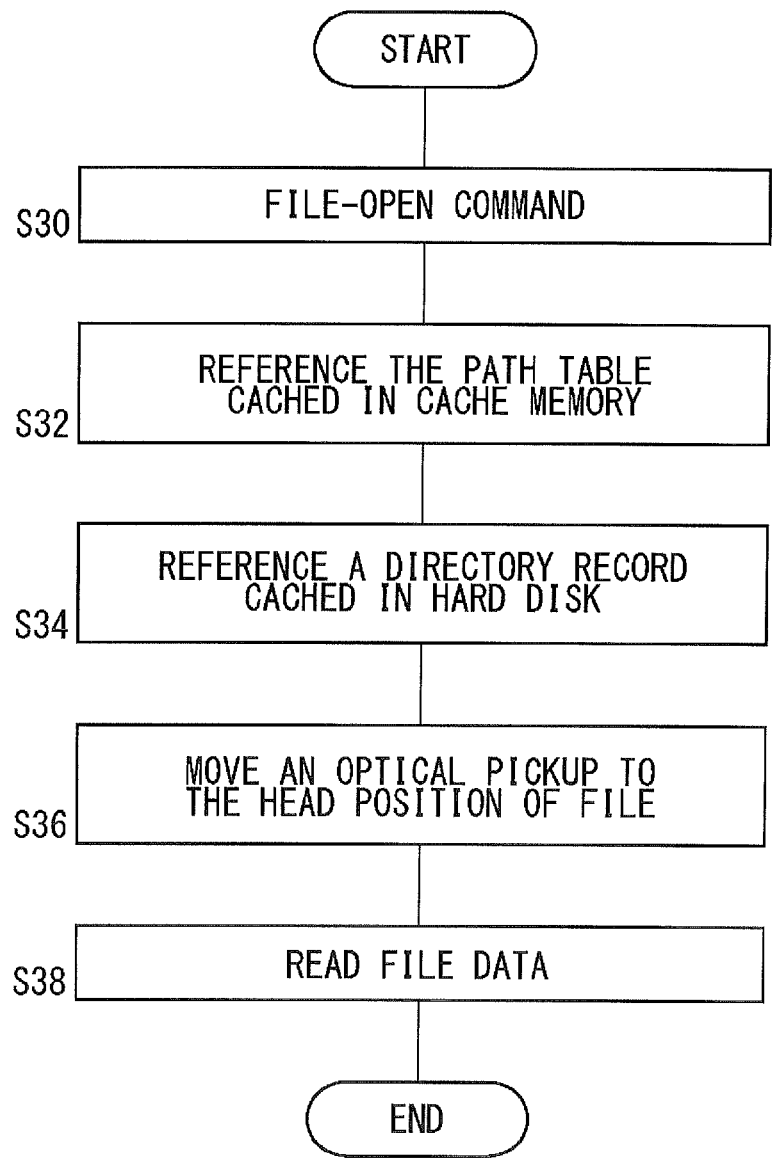
FIG. 11 is a flowchart for explaining a procedure for reading a file from an optical disc by the disc access apparatus of FIG. 1.

FIG. 11 is a flowchart to explain a procedure, performed by the disc access apparatus of FIG. 1, for reading a file from the optical disc 10.

As a command to open a specified file stored in a given directory is issued (S30), the processor 40 references the path table 110 cached in the cache memory 18 and obtains the positional information on the directory (S32). The processor 40 references an applicable directory record in the directory table 180 cached in the hard disk 30, based on the positional information on the directory, and obtains the positional information on the specified file stored in said directory (S34). The disc I/O controller 20 receives the positional information on the specified file, from the processor 40 and moves the optical pickup unit 12 to the top position of the specified file (S36) so as to read the data on the specified data (S38).

The path table 110 may be cached in the hard disk 30 instead of the cache memory 18. The directory records 120 of all the directories of a file system on the optical disc 10 may be cached in the hard disk 30 as the directory table 180. Alternatively, only directory records 120 corresponding to a part of the directories may be cached in the hard disk 30 as the directory table 180 and the directory records 120 of the remaining directories may be read from the optical disc 10.

Also, each directory record in the directory table 180 may be treated as a cache entry. In this case, only directory records that are frequently referenced may be kept in the directory table 180, and those that are not referenced may be deleted from the directory table 180. In other words, the directory table 180 stored in the hard disk 30 may operate literally as a cache for the directory records 120 in the directory area 170 on the optical disc 10. In such a case, the directory table 180 may be stored in the cache memory 18 instead.

At least part of the path table 110 and the directory table 180 may be stored in the main memory 36 or the cache memory 18. The path table 110 and the directory table 180 may be stored in an arbitrary storage medium or memory device whose access time is less than the optical disc 10.

The present invention has been described based upon illustrative embodiments. These exemplary embodiments are intended to be illustrative only and it will be obvious to those skilled in the art that various modifications to the combination of constituting elements and processes could be developed and that such modifications are also within the scope of the present invention.

A description has been given of the embodiments using an example where the path table or directory records having the ISO 9660 format. This should not be considered as limiting and the file system of the optical disc may be of any format as long as any kind of information on directories is stored separately from the file data. The information on the directories is read beforehand when the optical disc is loaded, and then cached in the hard disk. This achieves an efficient access to files using the procedures described in the embodiments.

The present invention is applicable to a disc access technology.

The invention claimed is:

1. A disc access apparatus comprising:
a cache configured to temporarily hold directory information on a file system recorded on a disc medium;
a processor configured to reference the directory information held in the cache when a file on the disc medium is accessed, so as to obtain information related to a position, on the disc medium, where the file to be accessed is located, wherein the processor selects whether or not the directory information is to be held in the cache depending on a processing cost of a media type detected when the disc medium is loaded; and
a disc controller configured to read data on the file to be accessed, by moving a pickup unit to a location indicated by the positional information wherein the pickup unit is used to detect a signal from the disc medium.

2. A disc access apparatus according to claim 1, wherein the cache is provided on a hard disk whose seek time is less than the disc medium.

3. A disc access apparatus according to claim 1, wherein the disc directory information is read when the disc medium is loaded, and the disc directory information is temporarily held in the cache.

4. A disc access apparatus according to claim 3, wherein after the processor has the disc controller read the directory information to cache the directory information when the disc medium is loaded, the processor uses the cached directory information before the disc medium is loaded again into the disc controller, and
whereby the processor does not have the disc controller read again the directory information.

5. A disc access apparatus according to claim 1, wherein the disc medium is provided with at least two layers for recording information, and
the disc controller performs a control in such a manner that when the directory information is recorded in a first recording layer of the disc medium and the file is recorded in the first recording layer or second recording layer, the depth of focus of an optical system in the pickup unit is adjusted in accordance with the depth of the first recording layer to read the directory information when the disc medium is loaded, and
after the disc medium has been loaded, the depth of focus thereof is adjusted in accordance with the depth of the first or second recording layer to read the file.

6. A disc access method comprising:
reading directory information on a file system recorded on a disc medium;
selecting whether the directory information is to be held in cache based on an expected processing cost of a media type detected when the disc medium is read;
caching the directory information in a recording medium whose read rate is higher than the disc medium;
referencing the cached directory information when a file of the file system is accessed, so as to obtain information related to a position, on the disc medium, where the file to be accessed is located, without accessing the directory information on the disc medium; and
reading data on the file to be accessed, from a location indicated by the positional information on the disc medium.

7. A program embedded in a non-transitory computer readable medium, the program comprising:
a directory information caching module operative to cache directory information on a file system recorded in a first layer of a disc medium provided with a recording structure having at least two recording layers, wherein the directory information caching module selects whether or not the directory information is to be held in the cache depending on a processing cost of a media type detected when the disc medium is loaded;
a directory information referencing module operative to reference the cached directory information when a file recorded in a first or second layer on the disc medium is accessed, so as to obtain information related to a position, on the disc medium, where the file to be accessed is located, without accessing the directory information recorded in the first layer on the disc medium; and
a data reading module operative to read data on the file to be accessed, from a location indicated by the positional information on the disc medium.

8. A disc access apparatus according to claim 1, wherein the processor selects whether or not the directory information is to be held in the cache further depending on whether the latency of seeking and reading the directory information from the loaded disc medium is covered up by the playing of the file to be accessed.

* * * * *